United States Patent
Walker

(10) Patent No.: US 9,133,537 B2
(45) Date of Patent: Sep. 15, 2015

(54) SUPERALLOY COMPONENT AND METHOD OF IMPROVING THE SAME

(75) Inventor: Paul Mathew Walker, Dunholme (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 69 days.

(21) Appl. No.: 13/263,011

(22) PCT Filed: Feb. 18, 2010

(86) PCT No.: PCT/EP2010/052016
§ 371 (c)(1),
(2), (4) Date: Dec. 22, 2011

(87) PCT Pub. No.: WO2010/115653
PCT Pub. Date: Oct. 14, 2010

(65) Prior Publication Data
US 2012/0085468 A1  Apr. 12, 2012

(30) Foreign Application Priority Data
Apr. 9, 2009  (EP) .................................... 09005237

(51) Int. Cl.
| C08F 2/48 | (2006.01) |
| C22C 19/05 | (2006.01) |
| B32B 15/01 | (2006.01) |
| C22C 19/00 | (2006.01) |
| C22C 19/07 | (2006.01) |
| C23C 10/30 | (2006.01) |
| C23C 24/10 | (2006.01) |
| C23C 26/02 | (2006.01) |
| C22C 7/00 | (2006.01) |
| C22F 1/10 | (2006.01) |

(52) U.S. Cl.
CPC ................. *C22C 19/05* (2013.01); *B32B 15/01* (2013.01); *C22C 19/007* (2013.01); *C22C 19/07* (2013.01); *C23C 10/30* (2013.01); *C23C 24/106* (2013.01); *C23C 26/02* (2013.01)

(58) Field of Classification Search
USPC .................................. 148/400, 527; 427/508
See application file for complete search history.

(56) References Cited

U.S. PATENT DOCUMENTS

| 4,615,864 A | 10/1986 | Dardi et al. |
| 5,240,491 A | 8/1993 | Budinger et al. |
| 5,622,638 A | 4/1997 | Schell et al. |
| 5,628,814 A | 5/1997 | Reeves et al. |
| 5,961,861 A * | 10/1999 | McCay et al. ........... 219/121.83 |
| 2006/0269687 A1 | 11/2006 | Lineton et al. |

FOREIGN PATENT DOCUMENTS

| CN | 101218040 A | 7/2008 |
| EP | 0207874 A2 | 1/1987 |
| EP | 0 486 489 B1 | 11/1994 |
| EP | 0 786 017 B1 | 3/1999 |
| EP | 1172460 A2 | 1/2002 |
| EP | 1295970 A1 | 3/2003 |
| EP | 1 306 456 A1 | 5/2003 |

* cited by examiner

Primary Examiner — Kaj K Olsen
Assistant Examiner — Alexander Polyansky

(57) ABSTRACT

A method of improving a superalloy component is proposed. The method involves the introduction of at least one additive into the superalloy component, the at least one additive being selected from the group of Hf, La, and Y. The at least one additive is introduced into a surface layer of the component. Preferably, the surface layer has a depth of 0.5 mm or less. The component may include, for example, an airfoil of a gas turbine.

9 Claims, 1 Drawing Sheet

SUPERALLOY COMPONENT AND METHOD OF IMPROVING THE SAME

CROSS REFERENCE TO RELATED APPLICATIONS

This application is the US National Stage of International Application No. PCT/EP2010/052016, filed Feb. 18, 2010 and claims the benefit thereof. The International Application claims the benefits of European application No 09005237.4 filed Apr. 9, 2009. All of the applications are incorporated by reference herein in their entirety.

FIELD OF INVENTION

The present invention relates to a superalloy component and to a method of improving a superalloy component.

BACKGROUND OF INVENTION

Components that are exposed to hot corrosive gases, like for example gas turbine components which are exposed to the hot and corrosive combustion gas, are typically made of superalloys which offer a high strength at elevated temperatures. Such superalloys are usually based on nickel (Ni), cobalt (Co) or iron (Fe). Although superalloys show high strength at temperatures up to 1200° C. and more they need to be protected from oxidation and/or corrosion. This protection is typically provided by an alumina scale which is either formed in the surface of the superalloy component or by so called MCrAlY-overlay coatings, in which M stands for nickel, cobalt or iron and Y represents yttrium (Y), hafnium (Hf), or a rare earth element. During the preparation of the overlay coating the aluminium is oxidized and forms a tightly adherent scale of alumina which protects a component from oxidation and/or corrosion. Such coatings are, for example, known from EP 0 486 489 B1, EP 0 786 017 B1, or EP 1 306 456 A1. From U.S. Pat. No. 4,615,864 it is known that addition of hafnium, yttrium or lanthanum (La) to the MCrAlY composition is beneficial because the oxides of these materials assist in pinning the alumina scale.

A coating may also be called Thermal Barrier Coating (TBC) if it is intended to provide thermal insulation, e.g. of turbine aerofoils of gas turbines.

SUMMARY OF INVENTION

With respect to the mentioned prior art is an objective of the present invention to provide a method of improving a superalloy component such as a gas turbine component, as well as to provide such an improved component.

This objective is solved by the features of the independent claims. The depending claims contain further developments of the invention.

In the inventive method, a superalloy component, in particular a nickel based superalloy component, a cobalt based superalloy component or an iron based superalloy component is improved by at least one additive chosen from the group of Hf, La, and Y. According to the invention, the at least one additive is introduced into a surface layer of the component. The surface layer may have a depth of 0.5 mm or less, preferably 0.25 mm or less.

Introducing at least one additive chosen from the group of hafnium, lanthanum and yttrium into the surface layer of a superalloy component improves the component in that a later applied thermal barrier coating (TBC) including a MCrAlY-coating shows an improved oxidation resistance due to the additives. The improved oxidation resistance increases lifetime of the coating. Moreover, pinning of the protective oxide scale in the MCrAlY-coating is improved, too, which also improves lifetime of the coating. By adding the additive only to the surface layer the additive is there where it can show its beneficial effect when a thermal barrier coating is applied without causing difficulties which could arise if the additives were added in large quantities within the bulk cast material of the superalloy component.

Note that only one of the additives chosen from the group of hafnium, lanthanum and yttrium needs to be present within the scope of the present invention. However, the scope of the invention also includes the presence of at least two additives chosen from the group of hafnium, lanthanum and yttrium, or the case where all three elements are present. If at least two additives chosen from the mentioned group are present the additives can be introduced after each other into a surface layer of the component, or they can be introduced simultaneously. In case all three elements are present as additives either all three can be introduced after one another or simultaneously. A further alternative is to introduce the additives with two of the elements introduced simultaneously while the third one is introduced before or after the other two.

If hafnium is used as additive it is introduced into the surface layer up to an amount of 5%, preferably up to an amount of 1% by weight of the material composition of the surface layer. If yttrium is used as additive it is introduced into the surface layer up to an amount of 0.2%, preferably up to an amount of 0.05% by weight of the material composition of the surface layer. If lanthanum is used as additive it is introduced into the surface layer up to an amount of 0.2%, preferably up to an amount of 0.05% by weight of the material composition of the surface layer.

The at least one additive may be introduced into the surface layer by melting it into the surface. Alternatively, the at least one additive may be introduced into the surface layer by diffusing it into the surface layer.

Melting the additive into the surface layer may be accomplished by heating the surface, in particular by locally heating surface, e.g., by means of laser. Locally heating the surface allows for locally melting the surface and for letting the melted surface solidify in a directionally oriented manner so that this method of introducing the additive is useful if the inventive method is to be applied to a single crystal or directionally solidified superalloy component. In such a local heating method the surface would be scanned by the heating means, e.g. by the mentioned laser.

In case the additive shall be diffused into the surface of the superalloyed component the diffusing can be accomplished by usual heat treatments as they are known by a person skilled in the art.

For accomplishing the melting or diffusing process a slurry matrix containing at least one additive can be applied onto the surface. The surface is then heated locally or globally with the slurry applied thereon. Such a slurry matrix would advantageously comprise the base material of the superalloy, i.e. nickel in case of a nickel based superalloy, cobalt in case of a cobalt based superalloy and iron in case of an iron based superalloy, and an organic binder. Organic binders can, in particular be chromate and phosphate organic binders.

According to a further development of the inventive method, an oxidation and/or corrosion resistant coating, e.g. in form of a thermal barrier coating, is applied onto the surface of the superalloy component after the additive has been introduced into the surface layer of the component. Such a thermal barrier coating would advantageously comprise a MCrAlY-coating to achieve the benefit of the mentioned assist in pinning the alumina scale by the additive introduced into the superalloy component surface layer.

An inventive supperalloy component has a surface layer comprising an additive chosen from the group of hafnium, lanthanum and yttrium. This surface layer may have a depth of 0.5 mm or less, preferably 0.25 mm or less. The advantages which can be achieved with such a superalloy component have already been discussed with respect to the inventive method. Therefore, with respect to the advantages achievable with the inventive superalloy component it is referred to the section of the description dealing with the inventive method.

The superalloy component can comprise an oxidation and/or corrosion resistant coating on the surface layer. This coating may, in particular, be a thermal barrier coating comprising a MCrAlY-coating.

Furthermore, the inventive superalloy component may, in particular, be made of superalloy material which is a single crystal material or a directionally solidified material.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

An embodiment of the inventive method of improving a superalloy component by at least one additive chosen from the group of hafnium, lanthanum, and yttrium will be described with respect to FIG. 1. In the inventive method, the at least one additive is introduced into a surface layer of the component 1, which may be a gas turbine component such as, for example, a turbine vane or blade or a liner element of a hot gas path in the gas turbine. According to the embodiment depicted in FIG. 1 the additive is introduced into a surface layer 7 of the superalloy component 1 by means of a slurry 3 containing the additive. The slurry is applied onto the surface of the component 1 and then the slurry 3 is heated in order to melt the additives into the surface layer 7 of the component. In the present embodiment, the heating is implemented by a local heating process in which the location of the local heating is moved over the surface.

In a first step of the embodiment of the inventive method the slurry is formed comprising a solid content and an organic binder. The solid content includes, for example in form of a powder, in form of flakes, et cetera, the base material of the superalloy component and a certain amount of hafnium and/or lanthanum and/or yttrium. If, for example the superalloy component is made of a nickel based superalloy the solid content would contain nickel which would be the major part of the solid content. The organic binder can, for example, be an organic binder comprising chromate and phosphate. The organic binder could be present in an amount between 40% and 70% by weight of the slurry.

The amount of hafnium can be between 0 and 2,5% by weight of the slurry, preferably between 0 and 1% by weight of the slurry. The amount of yttrium can be between 0 and 0.1% by weight of the slurry, preferably between 0 and 0.05% by weight of the slurry. The amount of lanthanum can be between 0 and 0.1% by weight of the slurry, preferably between 0 and 0.05% by weight of the slurry. The balance of the slurry would substantially be the base material of the superalloy. Producing the slurry would be done by giving the solid content into the organic binder followed by a thorough mixing to form a homogenous slurry.

Figure 1:
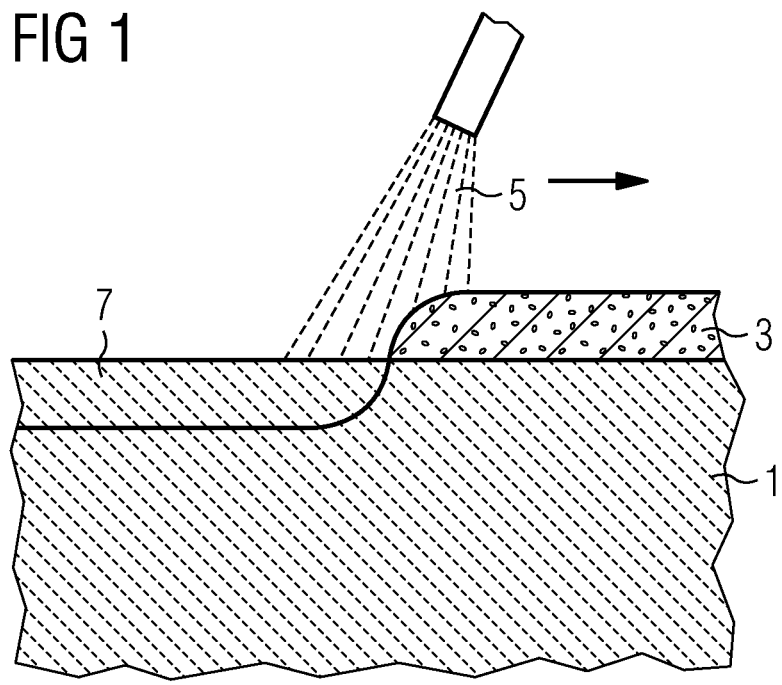
FIG. 1 schematically shows an embodiment of the inventive method of improving a superalloy component.

After forming the slurry, the slurry is applied onto the surface of the superalloy component 1 to form a slurry layer 3, as it is shown in FIG. 1. Applying the slurry onto the surface of the superalloy component 1 can be done by any suitable method, for example by spraying the slurry onto the surface of the component 1 and subjecting the component with the slurry applied thereon to a heat treatment with a temperature between 300° C. and 400° C., for example approximately 350° C. to cure the slurry.

After the cured slurry layer 3 has been formed on the surface of the superalloy component 1 by means of the heat treatment the surface is scanned by a laser beam 5 to locally melt the solid content of the slurry and a surface layer 7 of the superalloy component 1.

In the present embodiment, the superalloy component 1 is a directionally solidified component in which crystallographic grains are elongated along a common preferred direction. It could be however, as well be a single crystal component or a component without any preferred crystal direction.

In the heating process the laser beam 5 is moved over the surface of the superalloy component 1 along a direction which is determined by the preferred direction of extension of the grains in the superalloy material. The movement is schematically indicated by an arrow in FIG. 1. By carefully choosing the direction of movement and the power of the laser beam 5 per surface area of the heated spot one can achieve that the melt produced by the laser beam 5 adapts the crystallographic structure and orientation of the underlying solid crystal during solidification to adapt the directionally solidified structure of the bulk of the superalloy component 1.

Note, that although the superalloy component 1 of the present embodiment is a directionally solidified component it could as well be a single crystal component since locally heating the surface of the single crystal superalloy component could be used in the same manner as described above for letting the melt solidify with continuing the crystal structure of the bulk material of the superalloy component 1 so that after solidification the surface layer 7 forms a single crystal with the bulk of the component 1. In addition, it should be noted that the described procedure can, in principle, also be used with a superalloy component not having a directionally solidified or a single crystal structure.

During re-solidification of the melted solid content of the slurry and the surface layer 7 of the superalloy component 1 the hafnium and/or the lanthanum and/or yttrium is introduced into the surface layer 7.

During the heating by the laser beam 5 the organic components of the slurry volatize or, if they do not volatize, become brittle so that they can easily be removed from the surface, for example by slightly blasting the surface.

In the described embodiment of the inventive method the additive, i.e. the hafnium and/or lanthanum and/or yttrium, has been melted into the surface layer 7 of the superalloy component. However, it is also possible to introduce the additive into the surface layer 7 by a diffusion process. In this case the superalloy component 1 with the cured slurry layer 3 on the surface would be subjected to heat treatment the temperatures of which would be chosen such as to cause diffusion of the additive into the surface layer 7 of the superalloy component 1. This method of introducing the additive into the surface layer 7 is in particularly useful if there is no need for a surface layer 7 having a directionally solidified or single crystal structure.

After hafnium and/or lanthanum and/or yttrium has been introduced into the surface layer 7 of the superalloy component 1 a thermal barrier coating 9 comprising a ceramic coating 11 is applied onto the component surface. The thermal barrier coating can, for example, be a zirconia layer 11 the crystal structure of which is at least partially stabilized by yttrium, and a MCrAlY-layer 13 located between a zirconia layer 11 and the surface layer 7 of the superalloy component 1. MCrAlY-coatings and yttrium stabilized zirconia coatings as well as the methods of applying such coatings are known from the state of the art and will, therefore, not be explained here. During the application of the MCrAlY-coating 13 a protective alumina scale forms which is pinned to the surface of the superalloy component 1. Hafnium and/or yttrium and/or lanthanum assists in pinning the protective scale.

Figure 2:
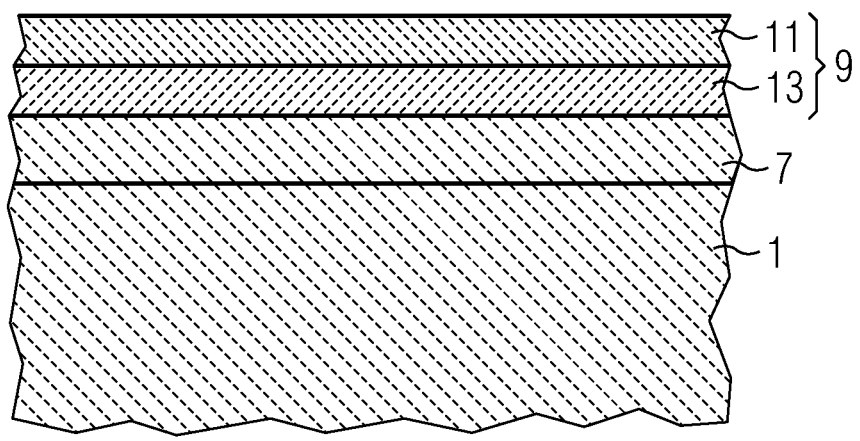
FIG. 2 shows an embodiment of the inventive superalloy component.

The result of the inventive method according to the described embodiment is an embodiment of an inventive superalloy component 1, as it is shown in FIG. 2. One can see the superalloy component 1 with the surface layer 7 containing hafnium and/or yttrium and/or lanthanum and the thermal barrier coating 9 applied thereon. However, the superalloy component according to the invention does not need to have the described thermal barrier coating or it could have a different kind of oxidation and/or corrosion resistant coating system forming an alumina sale.

According to the invention, a superalloy component is improved by introducing hafnium and /or hafnium and/or yttrium and/or lanthanum into a surface layer of the component. In particular, this allows for improving the properties of an oxidation and/or corrosion resistant coating applied on such an improved superalloy component.

The invention claimed is:

1. A method of improving a superalloy component, comprising:
   introducing at least one additive selected from the group consisting of Hf, La, and Y to the superalloy component, wherein the at least one additive is introduced into a surface layer of the superalloy component by:
   applying a slurry onto the surface layer, wherein the slurry comprises an organic binder and a solid content, with the solid content including the at least one additive and the base material of the superalloy, the at least one additive including Hf in an amount up to 2.5% by weight of the slurry and/or La in an amount up to 0.1% by weight of the slurry and/or Y in an amount up to 0.1% by weight of the slurry, with the base material of the superalloy substantially forming the balance of the slurry,
   subjecting the component with the slurry to a heat treatment to cure the slurry and form a cured slurry layer, and
   melting the slurry entirely into the surface layer of the component by scanning the surface with a laser beam to locally melt the solid content of the slurry and the surface layer,
   solidifying the melted solid content of the slurry and the surface layer to obtain a material composition of the surface layer,
   applying an oxidation and/or corrosion resistant coating directly over the solidified surface layer of the superalloy component.

2. The method as claimed in claim 1, wherein at least two additives selected from the group consisting of Hf, La, and Y are introduced into the surface layer of the superalloy component.

3. The method as claimed in claim 2, wherein the at least two additives are introduced into the surface layer of the component one after the other.

4. The method as claimed in claim 2, wherein the at least two additives are introduced into the surface layer of the component simultaneously.

5. The method as claimed in claim 1, wherein the at least one additive is introduced into the surface layer that has a depth of 0.5 mm or less.

6. The method as claimed in claim 1, wherein Hf is used as an additive and the material composition of the surface layer comprises Hf up to an amount of 5% by weight of the material composition of the surface layer.

7. The method as claimed in claim 1, wherein La is used as an additive and the material composition of the surface layer comprises La up to an amount of 0.2% by weight of the material composition of the surface layer.

8. The method as claimed in claim 1, wherein Y is used as an additive and the material composition of the surface layer comprises Y up to an amount of 0.2% by weight of the material composition of the surface layer.

9. The method as claimed in claim 1, wherein La and Y are used as additives and the material composition of the surface layer comprises La and Y up to an amount of 0.2% by weight of the material composition of the surface layer.

* * * * *